Jan. 17, 1967 C. H. HAAS 3,298,444
TURBINE IMPELLER ASSEMBLY
Filed Sept. 22, 1965 2 Sheets-Sheet 2
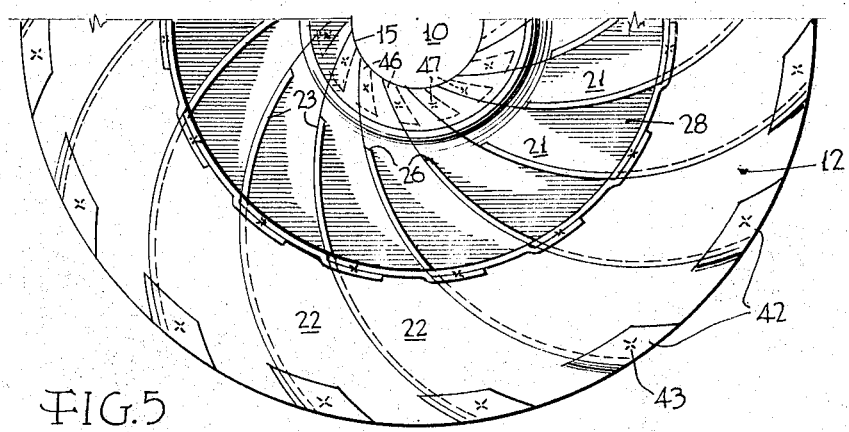
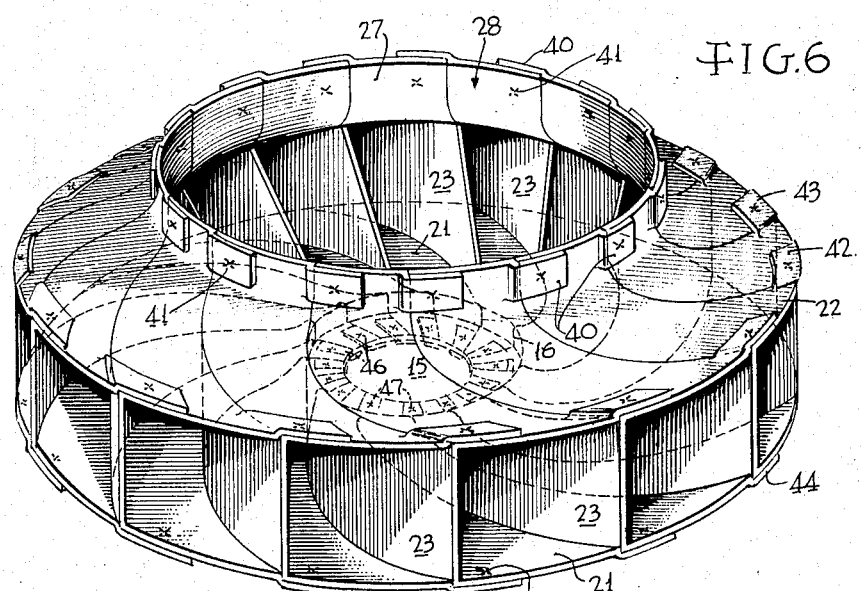
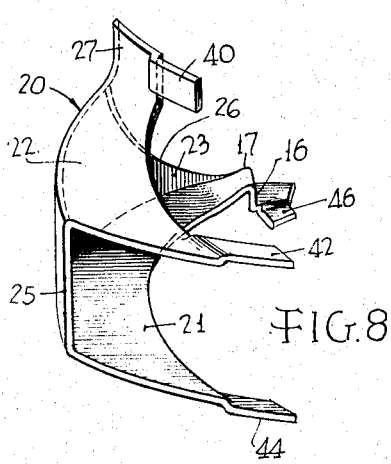
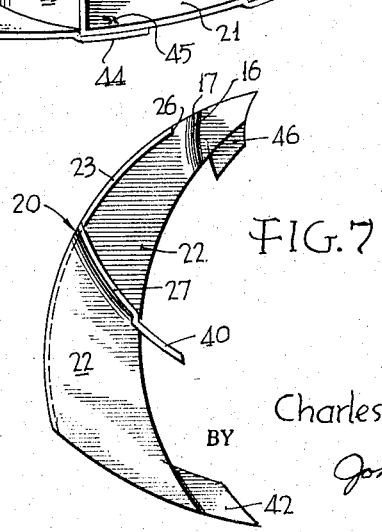
INVENTOR.
Charles H. Haas
BY
John B. Sowell
ATTORNEY United States Patent Office 3,298,444
Patented Jan. 17, 1967

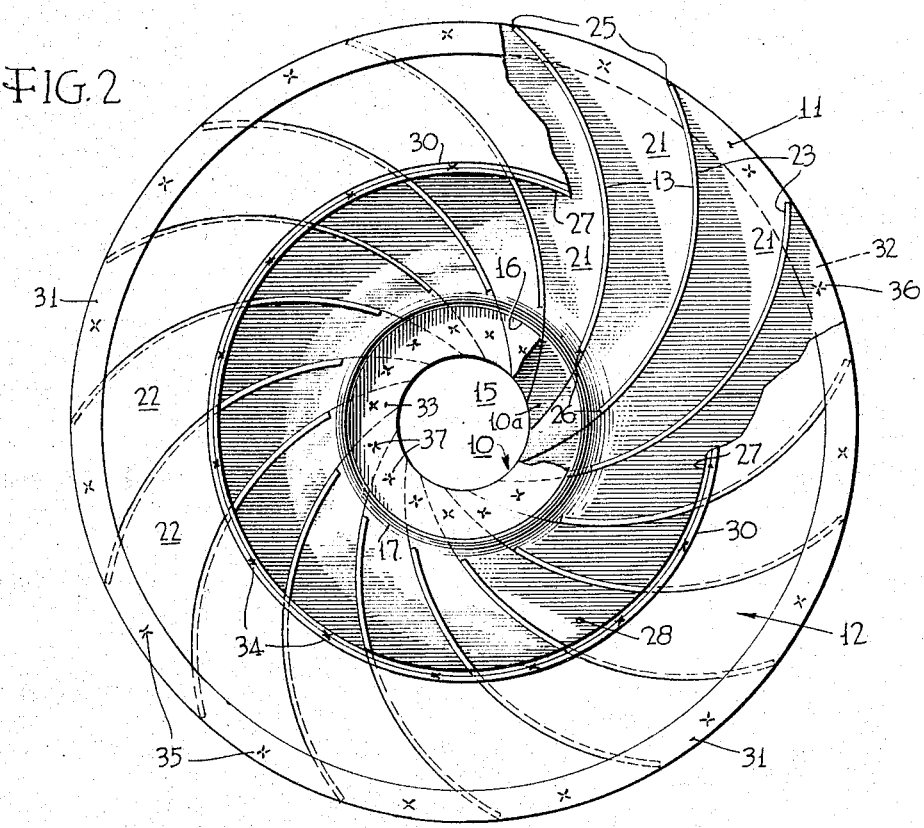
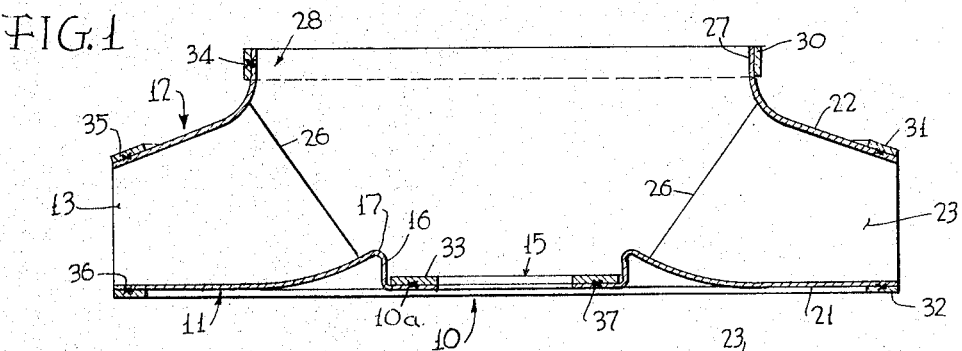
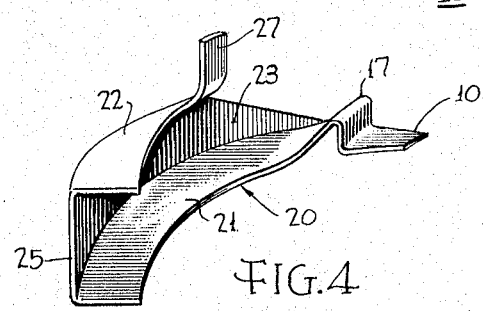
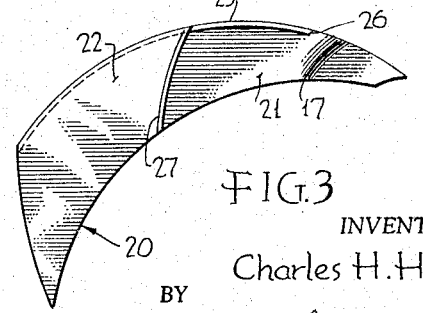

3,298,444
TURBINE IMPELLER ASSEMBLY
Charles H. Haas, Philadelphia, Pa., assignor to The Budd Company, Philadelphia, Pa., a corporation of Pennsylvania
Filed Sept. 22, 1965, Ser. No. 489,221
5 Claims. (Cl. 170—168)

This invention relates to a turbine impeller assembly and method of making it and has for an object the provision of improvements in this art.

One of the particular objects of the invention is to provide an impeller assembly composed of a plurality of identical press-formed sheet metal units which are secured together by welding to form the impeller assembly.

Another object is to provide an impeller assembly in which the connecting elements between units are all located in positions which are clear of the fluid flow space of the impeller.

Another object is to provide a welded sheet metal assembly which is so designed that all welds are loaded in shear.

Another object is to provide a composite impeller assembly in which the unit connecting elements form positioning means between units for welding.

Another object, in one specific form, is to provide connecting tabs on the units which form the positioning means between unit.

Another object, in one specific form, is to provide interconnecting rings which form the positioning means between units.

Another object is to provide a turbine impeller assembly which is relatively simple in design and easy and inexpensive to manufacture; which will be efficient in operation; and which will be durable in service.

Another object is to provide an improved method of making a turbine impeller by securing together a plurality of identical units which together form the full fluid passage enclosure.

The above and other objects, as well as various features of novelty and advantages, will be apparent from the following description of exemplary embodiments of the invention, reference being made to the accompanying drawings, in which:

FIG. 1 is an axial section through a turbine impeller assembly embodying the invention;

FIG. 2 is a top plan view of the assembly shown in FIG. 1, with parts cut away;

FIG. 3 is a top plan view of a single impeller blade or vane unit of the first form;

FIG. 4 is a perspective view of the blade unit shown in FIG. 3;

FIG. 5 is a partial top plan view of a modified form of turbine impeller assembly;

FIG. 6 is a top perspective view of the assembly shown in FIG. 5;

FIG. 7 is a perspective view of a single blade unit shown in FIG. 6;

FIG. 8 is a top plan view of a single impeller blade or vane unit of the second form.

The impeller assembly, as shown in FIGS. 1 and 2, comprises a hub portion 10 which is secured to a driving or driven part, a lower wall portion 11, an upper wall portion 12, and a plurality of circumferentially curved blades or vanes 13. The blades may also have axial curvature, if desired, but are shown with a single curvature for simplicity.

The hub portion 10, as at 10a, is disposed radially of the central longitudinal axis of rotation of the impeller and is formed with a central opening 15 which is closed by a shaft plate to which it is later connected. With such a central opening, the formation of the component units is simplified. The radial hub portion 10 is joined by an annular axial portion 16, and this is joined by an annular rib portion 17 which strengthens the assembly and keeps the fluid flow away from the radial hub portion.

According to the present invention the entire enclosing fluid-confining structure of the assembly is formed completely and solely by the component units which are provided and assembled together. This is made possible by forming each component unit 20 with a bottom sheet portion 21, a top sheet portion 22, and a connecting sidewall or axial blade portion 23 having the desired circumferential curvature.

The outer end of each component unit, in assembly, has a terminal line 25 of the sidewall portion 23 which is generally parallel to the central axis of rotation; at the end of the bottom sheet or wall portion 21 is generally radial; and the top sheet portion 22 is generally radial but with some slope toward the bottom wall.

The inner end of each component unit, in assembly, has a terminal line 26 of the sidewall 23 which is inclined outwardly away from the axis in an upward direction. The top sheet portion 22 curves upwardly near its inner end so that its inner terminal portion 27 is disposed substantially parallel to the central axis. In the assembly this leaves a large central opening 28 around the axis for axial flow of fluid. The fluid passages between blades or vanes increase in axial depth and decrease in circumferential width from the outside toward the inside in accordance with general turbine impeller practice.

As so far described, the structure of the two forms disclosed herein are identical and are identified by the same reference characters. That is to say, the structures of the two forms are identical insofar as fluid confining and flow passage structure is concerned. The differences in the two forms reside in the means and method by which the identical blade units are combined in the assembled construction; both forms, however, being alike in having the interconnecting means disposed wholly outside the fluid flow passages so that there is no parasitic fluid flow resistance introduced because of the interconnecting means provided. In both forms the interconnection is made by overlapped connecting elements which are welded to the walls of the units, preferably by resistance welding, and all welds are loaded in shear and not in tension.

In the first form (FIGS. 1–4) the blade units are secured together by a plurality of flat rings or bands which form at least a part of the jig fixture for holding the parts together in proper assembly position for welding.

There is an upper flat band 30 encircling the upturned axial portion 27 of the upper wall of the blade units; an upper out flat band 31 overlying the outer ends of the top wall of the units; a lower outer flat band 32 underlying the outer ends of the bottom wall of the units; and an inner radially disposed flat band 33 engaging the radial portion 10a, either above or below, but shown above. The band 30 is secured by spot welds 34 to the top wall; the band 31 is secured by spot welds 35 to the top wall; the band 32 is secured by spot welds 36 to the lower wall; and the band 33 is secured by spot welds 37 to the lower wall. Additional bands may be provided, if needed or desired, all being outside the main fluid flow passages.

In the second form (FIGS. 5–8) the interconnection between blade units is made by tabs provided on the units instead of by bands, as in the first form. The tabs may either be integral with the sheet material forming a unit or may be welded to the unit. As shown, there are inner upper tabs 40 welded at 41; outer upper tabs 42 welded at 43; outer lower tabs 44 welded at 45; and inner lower tabs 46 welded at 47.

In the second form the tabs of one unit, by overlapping the edge of an adjacent unit, partially hold the units in position for welding; but it is preferred to use a jig fixture to more securely and accurately hold the units in position for welding.

As shown, there are four welds for each unit. If there are fifteen units, as shown, there are only sixty welds required to make a complete coherent operative assembly. There may be more welds, if desired; and there may be more connecting elements, as stated, to make a stronger and more fluid-tight assembly.

It is thus seen that the invention provides a simple and inexpensive construction which is easy to assemble and connect. The identical press-formed units form the entire assembly insofar as fluid-flow zones are concerned, the interconnecting means being welded to the walls of the press-formed units outside the fluid-flow zones.

While certain embodiments of the invention have been disclosed for purposes of illustration it is to be understood that there may be various embodiments and modifications within the general scope of the invention.

I claim:

1. A sheet metal impeller assembly consisting of a plurality of identical press-formed sheet-metal channel-shaped blade units, each integral blade unit comprising: a top wall, a bottom wall, an integral side wall connecting the top and bottom walls and forming the impeller blade, and integral connecting means; said connecting means consisting of tab means on each blade unit joined with the next adjacent blade unit for securing said blade units together front-to-back in successive relationship to form the complete fluid containing enclosure with the connecting means located outside the fluid-flow zone.

2. An impeller assembly as set forth in claim 1, further characterized by the fact that said top wall comprises an axially disposed inner end portion and that said bottom wall comprises a radially disposed inner end portion, the outer ends of said top and bottom walls being generally radially disposed, and said connecting means being located at the inner and outer ends of said top and bottom walls.

3. An impeller assembly as set forth in claim 1, further characterized by the fact that said connecting means comprises tabs extending from the terminal edges of the said top and bottom walls and secured to the other edges of an adjacent blade unit.

4. An impeller assembly as set forth in claim 2, further characterized by the fact that said connecting means comprises tabs on the free edges of said top and bottom walls which overlap the other edges of said top and bottom walls respectively of an adjacent unit.

5. A sheet metal impeller assembly having a plurality of fluid passages for propelling a fluid internally thereof and consisting of a plurality of identical sheet metal channel-shaped blade units adapted to be assembled for forming a circularly shaped impeller: each blade unit including a top wall, a bottom wall, an integral side wall connecting said top wall and said bottom wall, and connecting means; said connecting means comprising tab means formed integrally on each blade unit, said tab means being positioned for everlying an external portion of the next adjacent blade for being joined thereto when in the assembled position whereby said tab means is not in the internal fluid flow area thereby providing an internal fluid flow passage free of obstructions; a plurality of said blade units being joined for forming a completed impeller wherein each of said blade units forms by cooperation with the next adjacent blade unit a fluid passage.

References Cited by the Examiner

UNITED STATES PATENTS

| 1,745,854 | 2/1930 | Lawaczeck | 103—115 |
| 2,336,231 | 12/1943 | Lodge | 103—115 |
| 2,598,620 | 5/1952 | Swift | 103—115 |

FOREIGN PATENTS

| 899,599 | 8/1944 | France. |
| 759,514 | 4/1953 | Germany. |
| 407,633 | 3/1934 | Great Britain. |
| 682,497 | 11/1952 | Great Britain. |

MARTIN P. SCHWADRON, *Primary Examiner.*

EVERETTE A. POWELL, JR., *Examiner.*